Nov. 13, 1962   N. KONDUR, JR   3,063,624
LATCH AND CONTROL MECHANISM
Filed April 25, 1960   3 Sheets-Sheet 1

INVENTOR.
NICHOLAS KONDUR Jr.
BY
Harry R. Dumont
ATTORNEY.

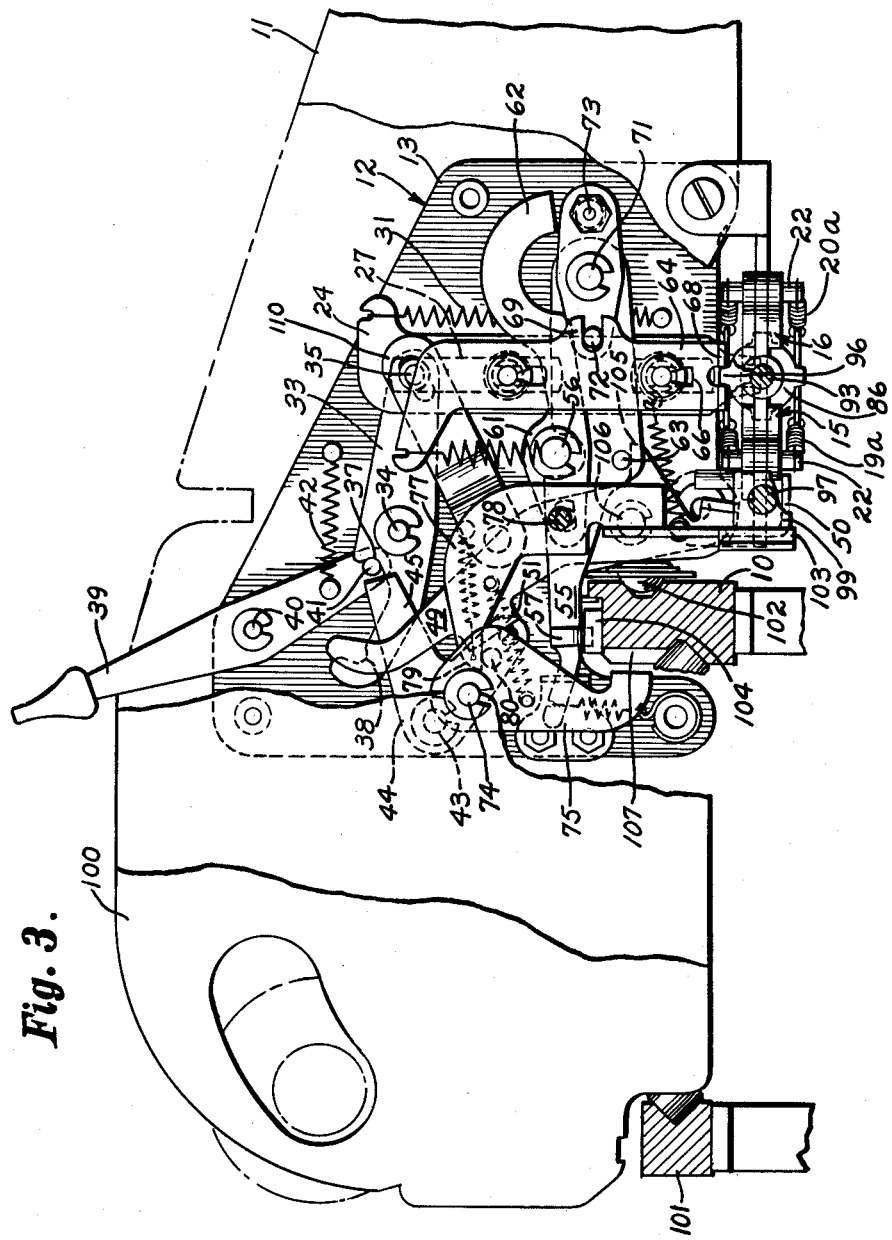

Nov. 13, 1962  N. KONDUR, JR  3,063,624
LATCH AND CONTROL MECHANISM
Filed April 25, 1960  3 Sheets-Sheet 3

INVENTOR.
NICHOLAS KONDUR JR.
BY
Harry R. Dumont
ATTORNEY.

United States Patent Office 3,063,624
Patented Nov. 13, 1962

3,063,624
LATCH AND CONTROL MECHANISM
Nicholas Kondur, Jr., Garden City, Mich., assignor to Burroughs Corporation, Detroit, Mich., a corporation of Michigan
Filed Apr. 25, 1960, Ser. No. 24,356
18 Claims. (Cl. 235—60.5)

This invention relates generally to bookkeeping machines having a movable carriage and a function control unit and more particularly to a latching and control mechanism to couple the function control unit to the carriage.

It is an object of this invention to provide an improved mechanism for latching a function control or program unit to a movable carriage so that vibration and impact forces arising from movement reinforce the secureness of the coupling.

It is a further object of this invention to provide a positive latching toggle mechanism whereby the latch release requires one movement and is restored to its normal or latched position by removal of the locked member.

It is an additional object of this invention to provide a latching mechanism for coupling a program unit to a carriage which mechanism is maintained in a locked condition when the carriage is out of its end position.

It is an additional object of this invention to provide a latching and control mechanism for coupling a program unit to a carriage which mechanism will prevent movement of the carriage from its end position when a program unit is uncoupled therefrom or insecurely latched thereto.

It is a further object of this invention to provide a toggle lock mechanism having a latch rendered active by insertion of a locked member.

It is a still further object of this invention to provide a latch mechanism which has a latch release restored to its normal position by removal of the locked member and held then in an inoperative position until another latched member has been inserted.

In accordance with the foregoing objects, the invention briefly described is a latching and control mechanism for use in coupling a function control unit to a carriage. A pair of opposed spring biased toggle jaws are utilized in combination with a latching slide to provide a positive gripping action for the program unit. When the jaws are in their closed position, the latch is interposed therebetween. A manually settable lever requiring one manual movement is provided for releasing the toggle jaws. Additional mechanism is provided for retaining the manually settable lever in its operated position which mechanism includes an operating lever coupled intermediate the latching slide and the manually settable lever. Restoring means for the manually settable lever is provided which includes an operating lever cooperating with a stud mounted on one of the toggle jaws and operable by movement thereof toward an open position to return the lever to its normal position. Blocking means are provided to maintain the manually settable lever in its normal position until the jaws are in their closed position.

The manner in which the above mentioned and other objects are accomplished and the above described invention operates will be readily understood in reference to the following specification when read in conjunction with the accompanying drawings wherein:

FIG. 3 is an elevation of the latch and contact mechanism with control panel in a locked condition;

Figures 1, 2:
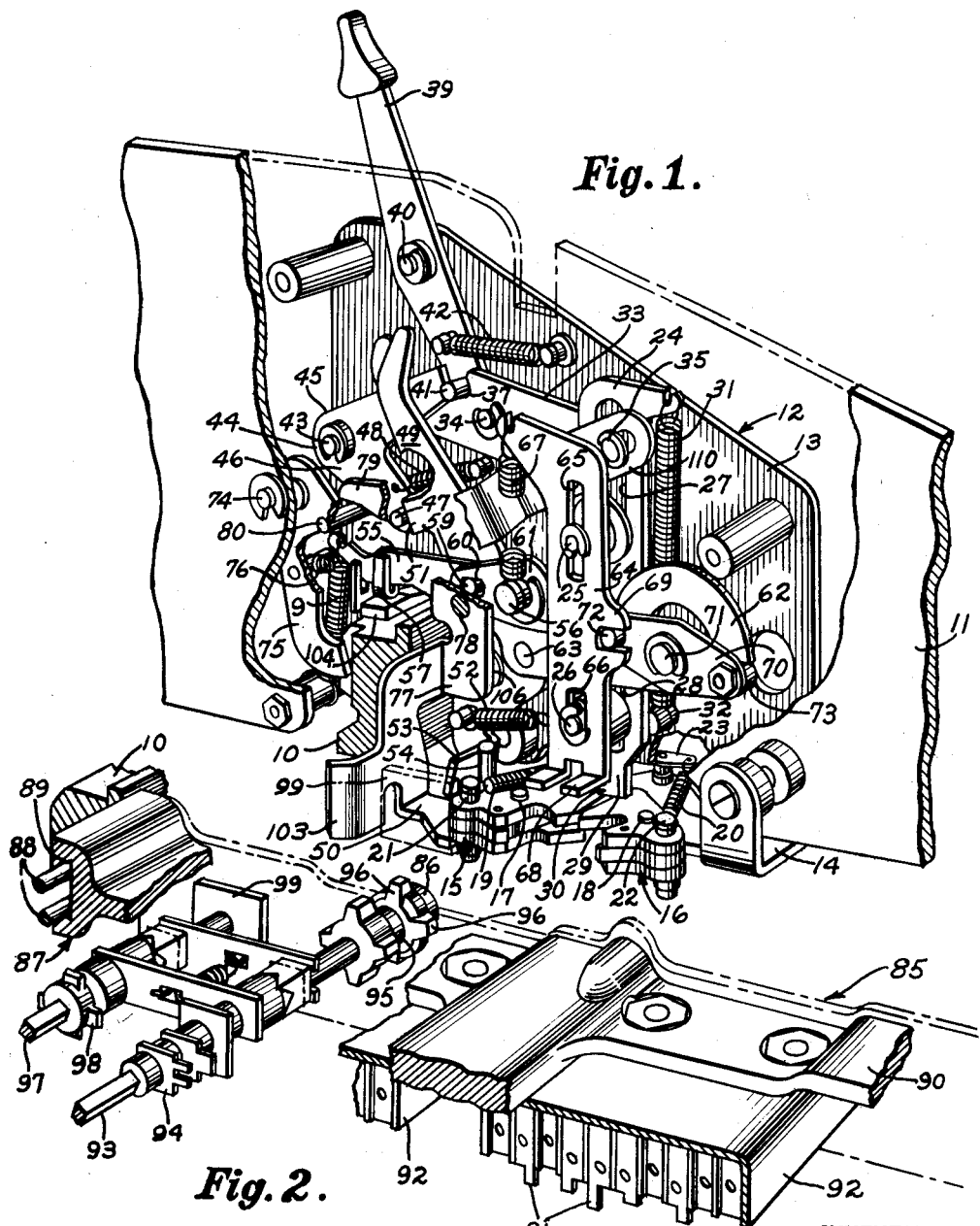
FIG. 1 is a detail perspective view of the latch and control mechanism as mounted on the carriage side frame with parts broken away to show structural details.
FIG. 2 is a detail partial perspective of the function control panel.

FIG. 1 shows the latch and control mechanism mounted on the carriage side frame 11 of an accounting machine. The accounting machine is of the general type disclosed and claimed in Patent No. 2,629,549, issued to T. M. Butler on February 24, 1953, and of common ownership herewith. The machine may be briefly described as a bookkeeping machine having a differentially positionable carriage. The machine is adapted for performance of a variety of accounting and bookkeeping functions and is controlled by an automatic work program embodied in a function control panel coupled to the carriage. The automatic work program and selection of machine functions are affected in accordance with the differential movements of the carriage. The latch and control mechanism is indicated by the numeral 12 and its mounting plate 13 is mounted on the outer surface of the left hand carriage side frame 11.

Shown in cross section is a portion of the carriage trackway 10 which provides a guideway for the differential positioning of the carriage. The plate 13 has a lower plate portion 14 bent at substantially a right angle inwardly from the carriage side frame 11. A lock mechanism is herein embodied as a pair of opposed jaws 15 and 16, which are mounted on the lower plate portion 14 by studs 17 and 18 and are shown in their open position. A pair of springs 19 and 20 are anchored forwardly on stud 21 of jaw 15 and stud 22 of jaw 16 and rearwardly on a common plate 23 which in turn is mounted on lower frame portion 14. A latching member here shown as slide 24 is mounted on plate 13 by means of studs 25 and 26 engaging longitudinal slots 27 and 28 respectively of slide 24. Slide 24 has a lower bevel shaped portion 29 here shown in engagement with its lower edge 30 abutting on the upper planar surface of jaws 15 and 16 in the open position of the jaws. The slide 24 is biased downwardly at its upper end by spring 31 which is anchored to stud 32 on plate 13. An operating lever 33 is pivotally mounted on plate 13 at stud 34 and carries a pin 35 which engages the longitudinal slot 27 in the upper end of slide 24. The outline of operating lever 33 at its upper periphery provides a pair of cut-out portions or notches 37 and 38. A manually settable lever 39 is pivotally mounted on plate 13 at pin 40 and carries a stud 41 near its lower end which engages notch 37. A spring 42 mounted on plate 13 is utilized to bias the lever 39 in a counterclockwise direction.

Pivotally mounted about stud 43 on plate 13 is a blocking means for lever 39 herein shown as bell crank 44 having an upper arm 45 engaging with its end portion stud 41 on lever 39 and carrying on its lower arm a stud 47. The bell crank 44 is urged in a counterclockwise direction by spring 48 anchored to plate 13. A lever 49 is pivotally mounted on plate 13 by stud 106 and has a lateral extension 51 near its upper end engaging stud 47 on the lower arm of bell crank 44. At its lower end the lever 49 is biased counterclockwise by spring 52. Extending in a direction substantially normal to the planar surface of the lever 49 and near its lower end is a lip 53 which engages the stud 54 mounted on the upper surface of jaw member 15 in the open position of jaws 15 and 16.

A lever 55 is pivotally mounted near its midpoint on plate 13 by stud 71 and has a downwardly protruding cam extension 57 near one end shown in abutment with a cam block 104 mounted on the upper surface of trackway 10. A stud 59 fixed on lever 55 engages a horizontally elongated slot 60 in a lever 61 which is pivotally mounted on stud 56 and has an arcuate end portion 62. Lever 55 has extending from its inner surface a stud 63. A vertical slide 64 having vertically elongated slots 65 and 66 is mounted on studs 25 and 26 in alignment with slide 24 and is biased downwardly by spring 67. Slide 64 at its lower end has a bifurcated projection 68 bent substantially at a right angle thereto and intermediate slots 65 and 66 has a lateral bifurcated extension 69. A link 70 is pivotally mounted on plate 13 on stud 71 and has an outwardly projecting stud 72 engaging the bifurcated extension 69 at one end and an inwardly projecting stud 73 in opposition to the edge of arcuate end portion 62 of lever 61. Mounted on side frame 11 and inwardly extending therefrom, is a stud 74 on which is pivotally mounted a lever 75 which is urged by a spring 76 in a counterclockwise direction toward a lever 77 which is similarly mounted on the inner surface of side frame 11 and pivotally mounted on a stud 78. The upper end portion 79 of lever 77 shown in part in this figure is adapted to engage a stud 80 mounted on the upper end of lever 75. The lower end portion of lever 77 comprises a bent portion or lug 103 and a boot 50 extending laterally and engaging the lower end of stud 21 on jaw 15. Lug 103 is shown in engagement with one side of square cam plate 99 which is also shown in FIG. 2.

FIG. 2 is a partial perspective of the function control panel 85 to be coupled to the carriage side frame 11 and is shown in an aligned position preparatory to being inserted in the latch and control unit 12 with a protruding part 86 which is adapted to be received and locked between jaws 15 and 16 in FIG. 1. The function control panel is substantially similar to that shown in FIG. 155 of the aforementioned Butler patent with the structural differences arising from the different mode of insertion. The function control panel of Butler is rear inserted whereas that which we are concerned with in the present application is adapted for side insertion. A portion of the carriage trackway 10 is shown mating with the raceway portion 87 of control panel 85 extending longitudinally along one of its edges. The raceway 87 includes a pair of rods 88 contained in a channel 89 which are adapted to engage with a plurality of ball bearings 102, hereinafter shown in FIG. 3, aligned along trackway 10 for longitudinal movement. A cast frame 90 carries a plurality of downwardly extending function control pins 91 retained in magazines 92 which control the accounting machine functions in the manner described in the aforementioned Butler patent. A shaft 93 formed of square section rod with turned end portions is rotatably mounted in the control panel and is positionable radially to one of a plurality of program selection positions—four in number for the panel here illustrated. Mounted along and non-rotatably fitted on shaft 93 are a plurality of control projections 94 which during tabulating movement of the carriage determine its columnar positions. Mounted at the end of shaft 93 is the mating projection or knob 86 which has a centrally located annular groove 95 and a series of four projections 96 arcuately disposed about its periphery. A second shaft 97 is mounted in the control panel parallel to shaft 93 and is also rotatively retained therein. The shafts 93 and 97 are coupled so as to rotate in unison to a position wherein one of the four possible programs is selected. Shaft 97 additionally carries a plurality of column control projections 98 disposed along its length and non-rotatably fixed thereon which serve to control the common stops of the accounting machine during an accounting machine cycle. Rigidly mounted on the end of the shaft is a square cam plate 99 also shown in phantom in FIG. 1 in the engaged position with the latch and control unit 12. Each of the flat edges of the cam plate 99 is registered corresponding to one of the four projections 96 on knob 86.

FIG. 3 shows the latch and control unit 12 and carriage 100 with side frame 11 in a condition wherein the panel is latched and the carriage is beyond its end position. The carriage 100 is shown supported for differential positioning along forward trackway 101 and rearward carriage trackway 10 which serves as a common guiding for both the carriage and the control panel with one of the plurality of ball bearings 102 shown which serve as trackway bearing elements for the raceway portion 87 of the control panel 85. When the carriage 100 is in a position intermediate its two end positions, the left end of lever 55 is in a lowered position relative to that illustrated in FIG. 1 because the cam extension 57 carried thereon has not been cammed upwardly by the cam block 104. The vertical slide 64 is maintained in its lowered position wherein its bifurcated projection 68 engages the upstanding projection 96 on knob 86 extending from shaft 93 of the control panel 85. This engagement prevents rotation of the shaft 93 to a different one of the four program selection positions while the carriage is in an operating position and outside its right end position as viewed from the front of the accounting machine or from the left in FIG. 1. Slide 24, which operates as the latching member, is also maintained in its lowered position intermediate the jaws 15 and 16 furthest from their gripping portions 111, 112. The jaws are maintained in a closed position around knob 86 of the control panel. Because the left end of lever 55 is in its lowered position, stud 63 carried thereon is in engagement with a lip 105 proximate the lower end of lever 49 which rotates lever 49 in a clockwise direction about its pivot 106 on plate 13. The lateral extension 51 near the upper end of lever 49 is displaced from stud 47 mounted on the lower arm of bell crank 44 whereby the bell crank is permitted to rock in a counterclockwise direction about stud 43 on plate 13 so that the upper arm 45 is placed in the path of stud 41 at the lower end of operating lever 39 restraining it from being manually operated to release the control panel when the carriage is outside its right end position. The square cam plate 99 on the end of shaft 97 has one of its flats engaging lug 103 at the lower end of lever 77. The upper end portion 79 of lever 77 is in abutment with stud 80 on lever 75 whereby it is urged in a clockwise direction about the stud 74 whereby the lower end of lever 75 is maintained away from the trackway 10. A notch 107 in rail 10 near the right hand end position of the carriage is adapted to receive the lower end portion of lever 75 when the cam plate 99 is not indexed with a flat in vertical alignment with the lug 103 of lever 77.

Figure 3A:
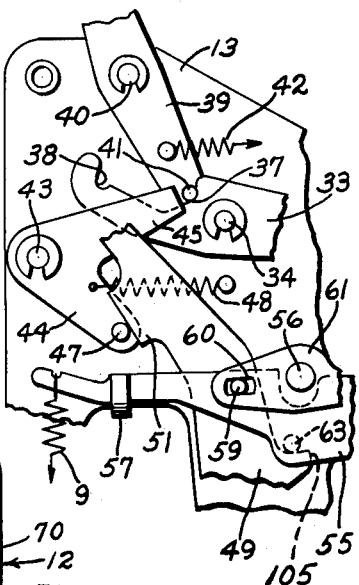
FIG. 3a is a view similar to FIG. 3 with parts removed and broken away to show structural detail.

FIG. 3a shows certain parts of the latch and control unit in their cooperative positions when the carriage is outside its end position and a control panel is latched thereto. Bell crank 44 is urged in a counterclockwise direction about stud 43 on plate 13 by means of spring 48. Lever 55 is urged downwardly at its left end by spring 9. Stud 63 bears against lateral extension 105 of lever 49 causing lever 49 to be displaced from stud 47 on the lower arm of bell crank 44 whereby bell crank 44 is pivoted counterclockwise and into the path of stud 41 on its lower end of operating lever 39. Stud 41 is seated in notch 37 of lever 33 which is in its unactuated position and maintained then by the tension of spring 42.

Figure 4:
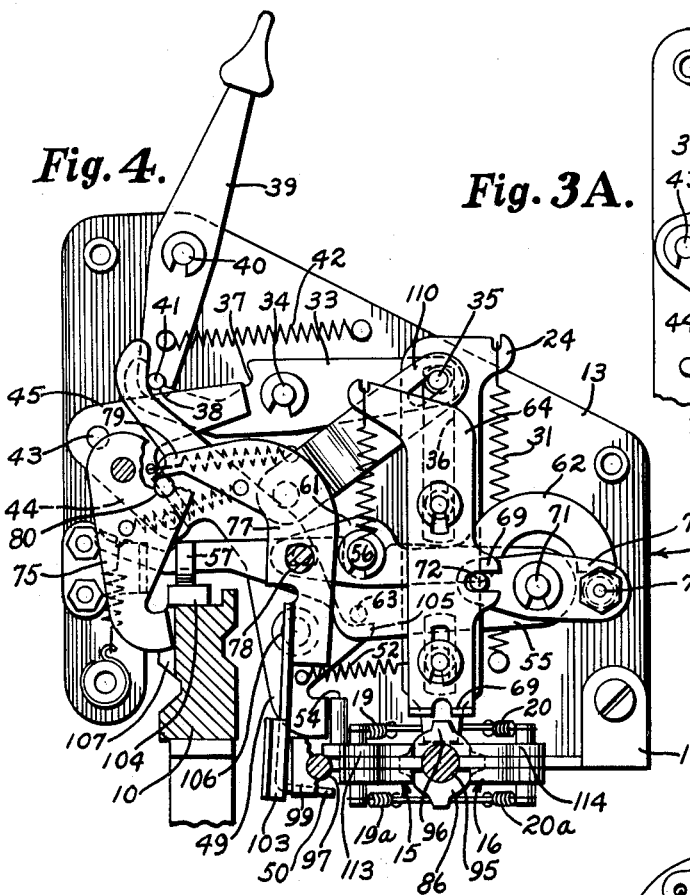
FIG. 4 is an elevation of the latch and control mechanism with the operating lever set in a release position.

FIG. 4 shows the latch and control unit 12 with the manually settable lever 39 in its operated position. The lever is rocked in a clockwise direction about stud 40 whereby stud 41 mounted thereon cams the left end of lever 33 downwardly causing operating lever 33 to rock in a counterclockwise direction whereby pin 35 raises latching member 24 so its lower edge 30 as shown in FIG. 1 lies above the upper surface of jaws 15 and 16. In its operated position, lever 39 has its stud 41 retained in notch 38 of lever 33 and in abutment with the upper end of lever 49. In its upward movement pin 35 has additionally displaced link 110 upwardly. Link 110 is pinned to lever 77 so that its upward movement has rocked lever 77 in a clockwise manner about stud 78 whereby the upper end portion 79 is displaced from stud 80 permitting lever 75 to be biased in a counterclockwise direction to engage its lower end portion in notch 107 of trackway 10. It should be noted that as soon as the carriage entered the end position, the cam block 104 located on trackway 10 cammed the left end of lever 55 upwardly through its action on cam extension 57 whereby the arcuate end portion 62 of lever 61 engaged stud 73 on link 70 whereby the link 70 was rocked in a clockwise direction about stud 71. Stud 72 on link 70 engaged bifurcated extensions 69 of slide 64 whereby the slide was raised withdrawing the bifurcated lower extension 69 from its engagement with projection 96 on knob 86 extending from the control panel. Also shown are a pair of springs 19a and 20a which correspond to springs 19 and 20 on the opposite face of jaws 15 and 16 which act to reinforce and balance the biasing action of springs 19 and 20.

Figure 5:
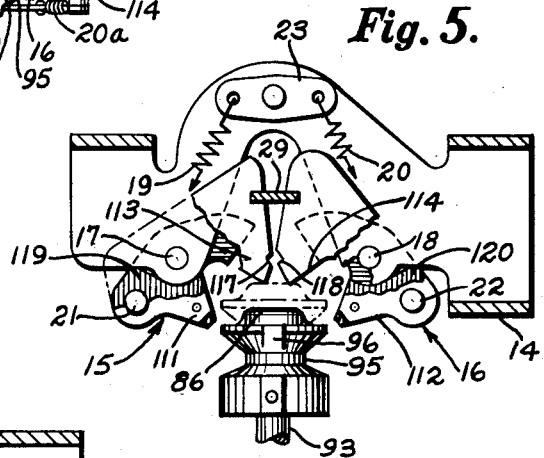
FIG. 5 is a top plan view of the toggle jaws in an open position.

FIG. 5 shows the jaws 15 and 16 in their open position in which they are biased by the over center action of springs 19, 19a, 20, and 20a. The jaws 15 and 16 have beveled gripping portions 111 and 112 respectively at opposed ends and lateral projections 113 and 114 at their other ends respectively. The knob 86 extending from shaft 93 in the control panel is aligned preparatory to insertion between the jaws. The lower edge 30 of the lower bevel shaped portion 29 of the latching member 24 is shown resting on the upper planar surface of projections 113 and 114 of the jaws. The projections 113 and 114 have a lesser mechanical clearance therebetween than the gripping portions 111 and 112. Pressure exerted by the forward end of knob 86 on the forward edge of lateral projections 113 and 114 will rotate jaw 15 in a counterclockwise direction and jaw 16 in a clockwise direction. This will change the toggle action of the jaws and springs 19 and 20 will tend to bias the jaws closed instead of open.

Figure 6:
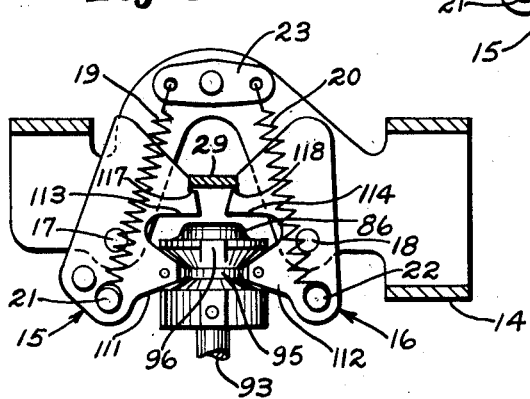
FIG. 6 is a top plan view of the toggle jaws in a closed position.

FIG. 6 shows the jaws 15 and 16 biased by the springs 19 and 20 in their closed position. The bevel portion 29 of latching member 24 has dropped between lateral projections 113 and 114 and engages them in notches 117 and 118. The beveled gripping portions 111 and 112 now grip the knob 86 in arcuate groove 95.

*Description of Operation*

The disclosed mechanism is so designed to permit coupling and uncoupling of the control panel only when the carriage is in its right hand end position as viewed from the front of the accounting machine. As best shown in FIGS. 1 and 2, the control panel 85 may be inserted or removed only when the carriage 100 is in its end position. The construction of the control panel 85 with downwardly projection control pins 91 which cooperate with a plurality of oppositely disposed tappets as shown in the aforementioned Butler patent renders this limitation necessary. If the control panel were removed in an intermediate position damage to the pins and tappets could result. In addition, if the program were changed in an intermediate position by rotation of shaft 93, the accounting machine program would be disrupted before its completion and erroneous entries by the machine could result.

As indicated in FIG. 4, when the carriage enters the end position, cam extension 57 on lever 55 is cammed upwardly by the surface of cam block 104. Lever 55 rocks in a clockwise direction about its pivot 71 thereby rocking lever 61 about stud 56 so that its arcuate end portion 62 moves downwardly engaging stud 73 on link 70 causing link 70 to be rotated in a clockwise direction about pivot 71 whereby the vertical slide 64 is elevated by the action of stud 72 in bifurcated projection 69 of the slide. The rearward or leftmost slide 24 remains in its lowered position as shown in FIGS. 4 and 6 with the knob 86 of the control panel 85 positively engaged between the jaws 15 and 16. The configuration of the knob 86 with its annular groove 95 permits rotation of the shaft 93 by the operator to change the selected program without the necessity of removing the panel from its positively locked position between gripping portions 111 and 112 of the jaws. Elevation of the slide 64 has displaced bifurcated projection 68 from engagement with one of the four projections 96 on knob 86 to allow rotation of shaft 93 by the operator. If removal of the control panel 85 and replacement with another panel is necessary, the latch and control unit has conditioned itself to make this possible. As best shown in FIGS. 4 and 3a, when lever 55 is cammed upwardly by the action of cam extension 57 acting on cam block 104, stud 63 is displaced from lateral extension 105 of lever 49 whereby lever 49 pivots counterclockwise about stud 106 through the biasing action of spring 52 whereby the lateral extension 51 bears against stud 47 on the lower arm of bell crank 44. As a result, the arm 45 of bell crank 44 is displaced downwardly and in a clockwise direction from the path of stud 41 on lever 39 so that the lever 39 may be manually placed into the unlatching position as shown in FIG. 4. When the lever is manually placed in the unlatched position its stud 41 is moved from notch 37 to notch 38 in operating lever 33 and during its path therebetween cams the lever 33 in a counterclockwise direction about its stud 34 whereby stud 35 carried on the end of lever 33 acts on slot 27 of slide 24 to elevate the slide from its interposed position between lateral projections 113 and 114 in notches 117 and 118 of jaws 15 and 16. When the beveled portion 29 at the lower end of slide 24 is removed from its FIG. 6 position between the jaws, the control panel may be removed from between the jaws by application by the operator of sufficient force to spread the jaws and overcome the toggle action of springs 19, 19a, 20, and 20a so that the jaws will be biased open to their FIG. 5 position and the gripping portions 111 and 112 will no longer engage the groove 95 in knob 86.

During the movement of jaws 15 and 16 from the closed to open position, the manually settable lever 39 will be reset to its unactuated position without requiring operator action. As shown in FIG. 1, stud 54 on jaw 15 engages the lower lip 53 on lever 49 and rocks it in a clockwise manner about pivot 106. The upper end of lever 49 displaces stud 41 of lever 39 from notch 38 in lever 33 to notch 37 therein when the arm 45 of bell crank 44 again restrains the lever from operation. An additional action was initiated by the operation of lever 39. The raising of stud 35 elevated link 110 rocking the lever 77 away from stud 80 on lever 75 whereby lever 75 rocked counterlockwise under the urging of spring 76 and engaged notch 107 in trackway 10 restraining the carriage from movement beyond its end position. During the opening of the jaws 15 and 16, the lower end of the stud 21, which anchors spring 19a to jaw 15, engages foot 50 formed on the lower end of lever 77 and rocks lever 77 in a clockwise manner about stud 78 thereby permitting lever 75 to maintain its engagement in notch 107 after removal of the clockwise force imparted by link 110 to lever 77. Thus the carriage remains locked in place on the trackway so long as the jaws remain open and no control panel has been locked therein. With the jaws in their open position, as shown in FIG. 1, a panel may be inserted by the operator by sliding the knob 86 of the panel between the jaws 15 and 16. As soon as the forward edge of the knob encounters the lateral projection 113 and 114, the jaws will be pivoted closed by the over center action of springs 19, 19a, 20, and 20a whereby the gripping portions engage in groove 95. As shown in FIG. 5, the beveled end portion 29 of slide 24 rests with its lower edge 30 on the upper planar surface of lateral projections 113 and 114 in the open position of jaws 15 and 16. As shown in FIG. 6, when the jaws close the beveled end portion of slide 24 become aligned with notches 117 and 118 in the lateral projections and drop therebetween, thereby securely latching the jaws in their locked or closed position about the knob 86. The beveled shapes of slide 24 and of gripping portions 111 and 112 of the jaws insure positive locking and latching of the panel in a manner which is reinforced by shocks and jars occurring during the normal differential movement and stopping of the carriage.

As shown in FIGS. 1 and 3, the square cam plate 99 mounted on the end of shaft 97 has one of its flats engaging the lug 103 at the lower end of lever 77 when the panel has been inserted in the latch and control unit 12. Provision is made to disable the carriage from movement unless the program indexed by the rotation of shaft 93 by the operator has been accurately positioned to one of the four selective positions. As hereinbefore mentioned, shafts 93 and 97 are coupled to rotate in unison. If the flat of square cam plate 99 is not registered in substantially vertical alignment, the lug 103 will be displaced in a clockwise direction whereby lever 77 will have its upper end portion 79 displaced from engagement with stud 80 on lever 75. As a result, lever 75 will be pivoted counterclockwise by spring 76 and maintained in notch 107 of track 10 whereby the carriage 100 will be locked in its end position.

It is readily apparent that a latch and control unit has been provided which insures a positive acting coupling for a control panel and permits ready change of units. In addition, interlocks have been provided which prevent operation of the accounting machine until the control panel has been securely latched and a program accurately registered. While the foregoing specification illustrates a preferred embodiment of the present invention, it will be understood that this is illustrative and not limitative and that changes in form, construction, and arrangement of parts may be made without departure from the scope of the invention.

What is claimed is:

1. In a locking mechanism comprising a supporting means, a pair of similar opposed jaws each having a gripping portion proximate one end and pivotally mounted at a point intermediate its ends on said supporting means, and biasing means between said jaws and said supporting means biasing said jaws towards each other in a first position wherein said gripping portions are separated by a distance and away from each other in a second position wherein said gripping portions are separated by a distance greater than the first mentioned distance, said biasing means including a pair of springs each fixedly attached at one end to a different one of said jaws proximate its said gripping portion and pivotally connected at its other end to said supporting means at a point such that at one site of said jaws within the interval intermediate said first and second jaw positions the axis of rotation of the said other end of each of said springs lies in a plane passing through the center of attachment of the said one end of a respective one of said springs to its corresponding jaw and the axis of rotation of said jaw with respect to the supporting means.

2. In a locking mechanism comprising a supporting means, a pair of similar opposed jaws each having a gripping portion proximate one end and pivotally mounted at a point intermediate its ends on said supporting means, biasing means between said jaws and said supporting means biasing said jaws towards each other in a first position wherein said gripping portions are separated by a distance and biasing said jaws away from each other in a second position wherein said gripping portions are separated by a distance greater than the first mentioned distance, and initiating means comprising a pair of juxtaposed projections each on a different one of said jaws proximate said gripping portion, said juxtaposed projections having a lesser distance therebetween than the first mentioned distance, said biasing means including a pair of springs each fixedly attached at one end to a different one of said jaws proximate its said gripping portion and pivotally connected at its other end to said supporting means at a point such that at one site of said jaws within the interval intermediate said first and second jaw positions the axis of rotation of the said other end of each of said springs lies in a plane passing through the center of attachment of the said one end of a respective one of said springs to its corresponding jaw and the axis of rotation of said jaw with respect to the supporting means.

3. In a locking mechanism comprising a supporting means, a pair of similar opposed jaws each having a gripping portion proximate one end and pivotally mounted at a point intermediate its ends on said supporting means, and biasing means between said jaws and said supporting means biasing said jaws towards each other in a first position wherein said gripping portions are separated by a distance and away from each other in a second position wherein said gripping portions are separated by a distance greater than the first mentioned distance, said biasing means including a pair of springs each fixedly attached at one end to a different one of said jaws proximate its said gripping portion and pivotally connected at its other end to said supporting means at a point such that at one site of said jaws within the interval intermediate said first and second jaw positions the axis of rotation of the said other end of each of said springs lies in a plane passing through the center of attachment of the said one end of a respective one of said springs to its corresponding jaw and the axis of rotation of said jaw with respect to the supporting means, the said one end of each of said springs being located inwardly of and out of contact with the peripheral edges of its corresponding jaw.

4. In combination, supporting means, a pair of similar opposed jaws pivotally mounted proximate their midpoints on said supporting means, each of said jaws having a gripping portion proximate one end thereof, biasing means fixedly attached to each of said jaws proximate the said gripping portion thereof and pivotally mounted on said supporting means, said jaws having a first position wherein said gripping portions are biased toward each other and a second position wherein said gripping portions are biased away from each other, and latch means operable to be interposed between said jaws proximate their ends furthest from said gripping portions.

5. In combination, a pair of similar opposed jaws each having in opposition to the other a gripping portion at one end and a notched projection proximate the other end, supporting means, means for pivotally mounting said jaws intermediate their ends on said supporting means, biasing means fixedly attached to each of said jaws proximate its end having said gripping portion and pivotally mounted on said supporting means, said jaws having a first position wherein said gripping portions are biased toward each other and having a second position wherein they are biased away from each other, and a latch member operable to be interposed between said jaws and abutting intermediate said notched projections when said jaws are maintained in their first position.

6. In combination, a pair of similar jaws having opposing gripping portions proximate one end and opposing notched projections proximate the other end, a supporting means, means for pivotally mounting said jaws at a point proximate their mid-points on said supporting means, biasing means fixedly attached to each of said jaws proximate the end having said gripping portions and pivotally mounted on said supporting means, said jaws having a first position wherein said gripping portions are biased toward each other and having a second position wherein said gripping portions are biased away from each other, and latching means biased in a direction normal to the plane in which said jaws are lying and operable to engage the surface of the said notched projections during the second position of said jaws and operable to be interposed therebetween responsive to said jaws assuming their first position.

7. In a lock mechanism comprising a pair of similar opposed jaws each having a gripping portion proximate one end, a supporting means, means for pivotally mounting said jaws at a point intermediate their ends on said supporting means, biasing means connected to each of said jaws proximate its gripping portion and pivotally mounted on said supporting means, said jaws having a first position wherein said gripping portions are biased toward each other and a second position wherein said gripping portions are biased away from each other, a latching slide and means biasing said slide in a direction toward the plane in which said jaws are lying, said slide being operable to abut on the planar surfaces of the ends of said jaws furthest from said gripping portions during the second position of said jaws and being interposed between said jaws during the first position of said jaws.

8. In a lock mechanism comprising a pair of similar opposed jaws each having a gripping portion proximate one end, supporting means, means for pivotally mounting said jaws at a point intermediate their ends on said supporting means, biasing means fixedly attached to each of said jaws proximate its gripping portion and pivotally mounted on said supporting means, said jaws having a first position wherein said gripping portions are biased toward each other and having a second position wherein said gripping portions are biased away from each other, a latch member, means for biasing said latch member in a direction toward the plane in which said jaws are lying, said latch member being operable to abut on the planar surfaces of said jaws at their ends furthest from said gripping portions during the second position of said jaws and being interposed between said jaws in their first position, and means operable prior to said jaws assuming their second position for retracting said latching member.

9. In a lock mechanism comprising a pair of similar opposed jaws each having a gripping portion proximate one end, supporting means, means for pivotally mounting said jaws at a point intermediate their ends on said supporting means, biasing means attached to each of said jaws proximate its gripping portion and anchored to said supporting means, said jaws having a first position wherein said gripping portions are biased toward each other and having a second position wherein said gripping portions are biased away from each other, a latching slide, means for biasing said slide toward the plane in which said jaws are lying, said slide being operable to abut on the planar surfaces of said jaws furthest from said gripping portion in the second position and being interposed between said jaws in their first position, settable means for retracting said latching means prior to said jaws assuming their second position, and means operable by the movement of said jaws toward their second position for resetting said settable means.

10. In a lock mechanism comprising a pair of similar opposed jaws each having a gripping portion proximate one end, supporting means, means for pivotally mounting said jaws at a point intermediate their ends on said supporting means, biasing means attached to each of said jaws proximate its gripping portion and anchored to said supporting means, said jaws having a first position wherein said gripping portions are biased toward each other and a second position wherein said gripping portions are biased away from each other, a latching member, means for biasing said latching member toward a point intermediate said jaws, said latching member being operable to abut on the periphery of said jaws at their ends furthest from said gripping portions in the second position of said jaws and being interposed between said jaws in the first position of said jaws, settable means for retracting said latching member prior to said jaws assuming their second position, and means intermediate said jaws and said settable means engaging at least one of said jaws during their movement from said first to said second position and operable to reset said settable means.

11. In a lock mechanism comprising a pair of similar opposed jaws each having a gripping portion proximate one end, supporting means, means for pivotally mounting said jaws at a point intermediate their ends on said supporting means, biasing means attached to each of said jaws proximate its gripping portion and anchored to said supporting means, said jaws having a first position wherein said gripping portion are biased toward each other and having a second position wherein said gripping portions are biased away from each other, a latching mechanism comprising a slide biased in a direction toward the plane in which said jaws are lying, said slide being operable to abut on the periphery of said jaws furthest from said gripping portions in their second position and being interposed between said jaws in their first position, settable means operable to retract said slide from its interposed position between said jaws prior to their movement from their first position, and means disabling said settable means from subsequent operation until said jaws have been fully restored to their first position.

12. In a lock mechanism comprising a pair of similar opposed jaws each having a gripping portion proximate one end, supporting means, means for pivotally mounting said jaws at a point intermediate their ends on said supporting means, biasing means attached to each of said jaws proximate its gripping portion and anchored to said supporting means, said jaws having a first position wherein said gripping portions are biased toward each other and movable to a second position wherein said gripping portions are biased away from each other, a latching member biased in a direction intermediate said jaws at their ends furthest from said gripping portions and operable to be interposed therebetween when said jaws are in said first postiion, settable means operable to retract said latching member from its interposed position between said jaws prior to their movement from said first to said second position, and means intermediate said settable means and said latching member operable to retain said settable means in its operated setting until said jaws have assumed their said second position.

13. In a lock mechanism comprising a pair of similar opposed jaws each having a gripping portion proximate one end, supporting means, means for pivotally mounting said jaws at a point intermediate their ends on said supporting means, biasing means attached to each of said jaws proximate its gripping portion and anchored to said supporting means, said jaws having a first position wherein said gripping portions are biased toward each other and having a second position wherein said gripping portions are biased away from each other, a latching member biased in a direction intermediate said jaws at their ends furthest from said gripping portions and operable to be interposed therebetween when said jaws are in said first position, settable means operable to retract said latching member from its interposed position between said jaws prior to their movement from said first to said second position, means intermediate said settable means and said latching member operable to retain said settable means in its operated setting until said jaws have assumed their said second position, and means responsive to the movement of said jaws from said second position to said first position operable to inhibit said manipulative means from subsequent operation until said jaws have assumed said first position.

14. In a lock mechanism comprising a pair of similar opposed jaws each having a gripping portion proximate one end, supporting means, means for pivotally mounting said jaws at a point intermediate their ends on said supporting means, biasing means attached to each of said jaws proximate its gripping portion and anchored to said supporting means, said jaws having a first position wherein said gripping portions are biased toward each other and movable to a second position wherein said gripping portions are biased away from each other, a latching mechanism comprising a slide biased in a direction intermediate said jaws at their ends furthest from said gripping portions and operable to be interposed therebetween when said jaws assume said first position, settable means operable to retract said slide from its interposed position between said jaws prior to their movement from said first to said second position, an operating means mounted on said supporting means intermediate said settable means and said slide and cooperable with said slide and engaging said settable means in its operating setting, said operating means being operable to retain said settable means in its operating setting until said jaws have assumed their second position.

15. In a machine having a differentially movable carriage, a trackway providing a support therefor, and a function control means, a pair of toggle jaws coupling said function control means to said carriage, a latching member interposed between said pair of toggle jaws, settable means operable to withdraw said latching means from its interposed position, blocking means operable to inhibit said settable means from actuation, and means responsive to said carriage reaching a predetermined position on said trackway operable to disable said blocking means.

16. In a machine having a member movable with respect thereto, a trackway providing support therefor, and a function control means, a pair of toggle jaws coupling said function control panel to said member, latching means interposed between said pair of toggle jaws, settable means operable to withdraw said latching means from its interposed position, blocking means operable to inhibit said settable means from actuation, and cam means mounted on said trackway in a fixed position operable to disable said blocking means responsive to the movement of said carriage thereto.

17. In a machine having a carriage movable between two end positions, a trackway providing support therefor, and a function control means, a pair of toggle jaws coupling said function control means to said carriage, a slide interposed between said pair of toggle jaws, settable means operable to withdraw said slide from its interposed position, blocking means operable to prevent actuation of said settable means, cam means mounted in a fixed position on said trackway corresponding to one end position of said carriage, and means engaging said blocking means and cooperable with said cam means to disengage said blocking means from said settable means.

18. In a machine having a carriage movable between two end positions, a trackway providing support therefor, and a function control means, a pair of toggle jaws coupling said function control means to said carriage, latching means interposed between said pair of toggle jaws, settable means operable to withdraw said latching means from its interposed position, blocking means operable to inhibit said settable means from actuation, means operable to lock said carriage to said trackway in one of its end positions, and cam means mounted in said trackway operable to disable said blocking means and simultaneously actuating said means operable to lock said carriage in one of its end positions.

References Cited in the file of this patent

UNITED STATES PATENTS

| | | |
|---|---|---|
| 621,574 | Kinsey | Mar. 21, 1899 |
| 928,030 | Crompton | July 13, 1909 |
| 2,634,051 | Anderson | Apr. 7, 1953 |
| 2,727,681 | Bogert | Dec. 20, 1955 |
| 2,978,172 | Pasinski | Apr. 4, 1961 |

FOREIGN PATENTS

| | | |
|---|---|---|
| 11,273 | Austria | Mar. 26, 1903 |
| 47,195 | Austria | Mar. 27, 1911 |